Patented Oct. 12, 1943

2,331,670

UNITED STATES PATENT OFFICE 2,331,670

MONOSUBSTITUTED CYANAMIDE AND A METHOD OF PREPARING THE SAME

Walter P. Ericks, Cos Cob, and Paul P. McClellan, Old Greenwich, Conn., assignors to American Cyanamid Company, New York, N. Y., a corporation of Maine No Drawing. Application August 30, 1941, Serial No. 409,058

9 Claims. (Cl. 260—551)

The present invention relates to derivatives of cyanamide, more particularly to new monoaliphatic substitution products and the method of preparation thereof.

These new compounds comprise the monosubstituted cyanamides which conform to the general formula,

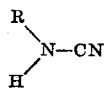

wherein R is an aliphatic radical of at least five carbon atoms chosen from the group consisting of alkyl, alkyl containing an oxygen atom as a hetero-atom in the carbon chain, and alkyl containing a sulphur atom as a hetero-atom in the carbon chain.

In the new compounds the R in the above formula may be a straight chain or a branched chain and either saturated or unsaturated. Typical examples are compounds in which R is a group such as n-amyl, sec.-amyl, n-hexyl, 2-ethylhexyl, n-octyl, iso-octyl, nonyl, decyl, dodecyl, tetradecyl, oleyl, cetyl, octadecyl, ceryl, montanyl, melissyl, dodecyloxyethyl, oleyloxyethyl, ethyloxypropyl, 2-ethylhexyloxypropyl, octadecyloxypropyl, sec. octyloxybutyl, tetradecyloxybutyl, ethylthiobutyl, n-amylthiopropyl, 2-ethylhexylthiopropyl, oleylthioethyl or octadecylthiopropyl.

It is to be further understood that the symbol R when used hereinafter will be defined as above.

The compounds of this invention are stable at room temperature and may be readily dispersed in water, or dissolved in organic solvents such as alcohol, acetone, benzene and toluene. The high molecular weight monosubstituted cyanamides are excellent softening and water-repellent agents for textile fibers, fiber materials or fabrics. Subsequent drying and heating of the impregnated fabric polymerizes the cyanamide, thus forming a film which renders the fabric soft, water-repellent and resistant to soap-washing and dry-cleaning. Consequently, these new materials are particularly useful in the manufacture of water-proofed clothing such as, for example, raincoats, military uniforms, snow suits, ski suits, etc. They also find use in waterproofing sails, tents, signal flags, bathroom curtains, shower curtains, etc.

Inasmuch as the monoalkyl cyanamides are reactive compounds, they may be utilized as starting materials for the synthesis of other compounds such as, for example, substituted dicyandiamides, guanidines, biguanides, guanyl ureas, guanyl thioureas, melamines, guanamines, guanides, etc.

The water-repellent properties of the high molecular weight monoalkyl cyanamides render them useful in the manufacture of wool, leather, paper, Cellophane, and rayon goods. The incorporation of these compounds in coating and molding compositions improve the resistance of the molded product to water, grease, and organic solvents. The cyanamide products of this invention are further useful as insecticides, antiseptics and as corrosion inhibitors in lubricating oils.

We have found the low molecular weight monoalkyl cyanamides containing four or less carbon atoms in the alkyl group to be very unstable at ordinary temperatures. For instance, the mono-n-butyl cyanamide, a mobile pale yellow liquid, on standing for only a few hours at room temperature polymerizes with evolution of heat to a light amber-colored viscous resin. The resinous product formed as a result of polymerization of the monoethyl cyanamide is soluble in water, alcohol, acetone and toluene. Cotton cloth impregnated with a polymerized mono-n-butyl cyanamide and subsequently cured at 130° C. for one-half hour showed no waterproofing properties.

We have also found that the known di-substituted cyanamides such as the dialkyl and diaryl substitution products do not produce the desired water-repellent effect to any substantial degree when the fabrics are impregnated therewith. The superiority in this respect of the products of this invention may be attributed to the active hydrogen in the molecule,

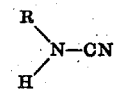

which permits polymerization and re-arrangement of the molecules to form di-substituted di-cyandiamides and tri-substituted iso-melamines according to the following equations:

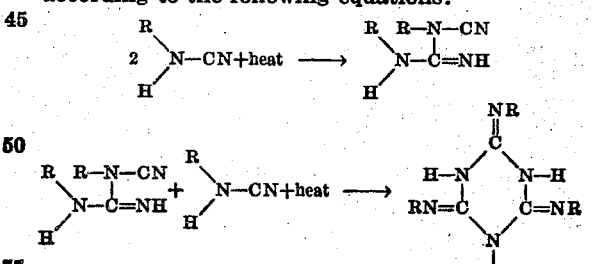

In preparing the monosubstituted cyanamides of this invention, we have discovered that the corresponding monoaliphatic amine, $RNH_2$, and a cyanogen halide react together in the proportion of two mols of the amine to one mol of the halide to form one mol each of the substituted cyanamide and the amine hydrohalide according to the following equation:

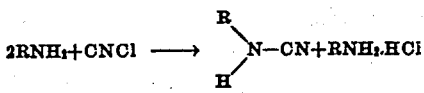

It is, therefore, impossible to obtain more than a 50% yield of the cyanamide based on the quantity of the amine utilized.

We have devised a method whereby equimolecular quantities of the monoaliphatic amine and the cyanogen halide are reacted together in such a manner that substantially theoretical yields of the monosubstituted cyanamide (based on the amine used) are obtained. This is accomplished by first reacting one mol equivalent of the amine with one-half mol equivalent of the cyanogen halide, followed by thorough agitation of the reaction mixture with an amount of aqueous alkali metal hydroxide sufficient to react with the amine hydrohalide present and thus free the amine. This reaction cycle is repeated several times until a total of one mol equivalent of the cyanogen halide is utilized and substantially all of the amine is converted to the cyanamide.

For instance in the second step, to the reaction mixture containing one-half mol equivalent of the amine there is added one-quarter mol equivalent of the cyanogen halide followed by addition of the requisite amount of alkali to liberate the amine from the amine hydrchalide. The following equations illustrate the procedure according to steps:

*Step 1*

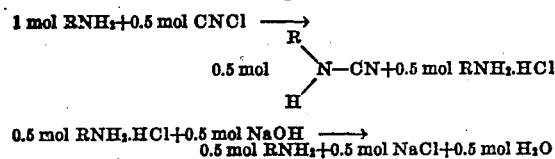

*Step 2*

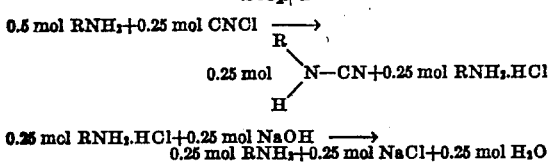

*Step 3*

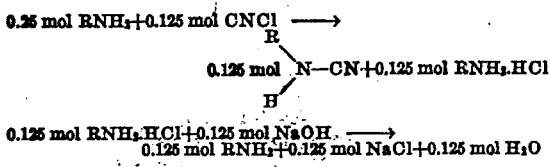

If the reaction mixture is found to be alkaline after a repetition of the cycle and after the final step of the above procedure, it is then neutralized with dilute hydrochloric acid prior to the recovery of the cyanamide.

It is exceedingly advantageous to carry out the above procedure in step-wise manner rather than unite at one time one mol equivalent each of the amine, the cyanogen halide and the alkali, because it avoids contact of the alkali with the cyanogen halide which otherwise would tend to react as follows:

$$2NaOH + CNCl \rightarrow NaOCN + NaCl + H_2O$$

The above method also avoids having an excess of alkali metal hydroxide present in the reaction mixture. This is also an important advantage inasmuch as an excess of the alkali would promote polymerization of the monosubstituted cyanamide.

When the amine is a solid it is desirable to employ an organic solvent such as for example carbon tetrachloride, diethyl ether, benzene, toluene or petroleum ether fractions. Water may be employed as the solvent for the low molecular weight amines.

The reaction mixture should be kept cool otherwise the monosubstituted cyanamide and the amine hydrohalide may react together and form the 1,3-disubstituted guanidine hydrohalide according to the following equation:

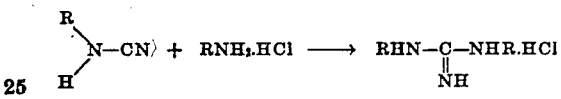

It is also important that a low temperature be maintained when a low boiling halide such as cyanogen chloride is utilized.

Other cyanogen halides may be used. However, as the bromide and iodide are normally solid, they can be conveniently used in a suitable solvent such as diethyl ether.

The invention will be further illustrated by the following examples:

*Example 1*

87.1 g. (1 mol) of mono-n-amylamine were charged into a reaction vessel equipped with a thermometer and a mechanical stirrer. A graduated cylinder (surrounded by a jacket in which a cold salt brine solution was circulated) was connected to the reaction vessel. Into this cylinder was charged 61.5 g. (1 mol) of cyanogen chloride occupying a volume of 52 cc. Another graduated cylinder containing 42.1 g. (1 mol) of 95% sodium hydroxide dissolved in 200 cc. of water (occupying a volume of 210 cc.) was connected to the reaction vessel.

200 cc. of water were added to the mono-n-amylamine. The solution was stirred and a temperature of 5° to 10° C. maintained throughout the run. The cyanogen chloride was added periodically to the amine solution. Each addition of the cyanogen chloride was followed by the addition of the sodium hydroxide solution as shown in the following table:

|  | Volume of solution (cc.) | |
| --- | --- | --- |
|  | CNCl | NaOH |
| Original quantity | 52.0 | 210.0 |
| 1st addition | 26.0 | 105.0 |
| 2nd addition | 13.0 | 52.5 |
| 3rd addition | 6.5 | 26.5 |
| 4th addition | 3.5 | 13 |
| 5th addition | 1.5 | 6.5 |
| 6th addition | 1.5 | 6.5 |

The reaction mixture was then stirred for 15 minutes. On standing the mono-n-amyl cyanamide separated as an oily layer above the water solution. The aqueous layer was drawn off and discarded. The product, a light yellow, oily liquid, having a specific gravity of 0.917 at 25°/25° C., weighed 105 grams and analyzed 24.3% nitrogen. Calculated nitrogen content for C₅H₁₁HNCN is 25.0%. It was soluble in alcohol, ether and benzene. It distilled at 130° C./8 mm. pressure with partial decomposition, leaving a brown resin as the residue.

*Example 2*

To a solution consisting of 129 g. (1 mol) of mono-2-ethylhexylamine dissolved in 200 cc. of toluene, maintained at a temperature of 5°–10° C., there were added intermittently 61.5 g. (1 mol) of cyanogen chloride and 42.1 g. (1 mol) of 95% sodium hydroxide dissolved in 200 cc. of water according to the procedure of Example 1. The reaction mixture consisted of an upper toluene layer and a lower water layer, the latter being discarded. The toluene layer was washed with water and dried with anhydrous calcium sulfate. After removing the toluene by distillation at 14 mm. pressure, the mono-2-ethylhexyl cyanamide was obtained as a pale yellow oil weighing 146 grams, equivalent to 94.6% of the theoretical yield.

*Example 3*

555 g. of monododecylamine were dissolved in 10 liters of toluene. The solution was stirred and cooled to 6° C., and 202.3 g. of cyanogen chloride and 139 g. of 95% sodium hydroxide made up with water to 900 cc. volume were added intermittently as described in Example 1. After adding the reagents the solution was stirred for an additional 3 hours. Two layers formed on standing. The upper toluene layer was treated according to the procedure of Example 2. The monododecyl cyanamide was obtained as a soft wax-like material weighing 620 grams, equivalent to 98.4% of the theoretical yield. The product analyzed 13.47% nitrogen. Calculated nitrogen content for C₁₂H₂₅HNCN is 13.45%.

*Example 4*

134.5 g. of mono-octadecylamine were dissolved in a solvent mixture consisting of 800 cc. of toluene and 600 cc. of diethyl ether. The solution was stirred and cooled to 10° C. 33.8 g. of cyanogen chloride and 25.2 g. of sodium hydroxide dissolved in 200 cc. of water were added in portions according to the procedure of Example 1. The reaction mixture was stirred for an additional 15 minutes and then allowed to stand for 6 hours. Two layers had formed. The upper ether-toluene layer was removed and evaporated on a steam bath at 14 mm. pressure. The product was dried in a shallow container at 65° C. for one hour. The mono-octadecyl cyanamide was a white waxy material which analyzed 9.50% nitrogen. Calculated nitrogen content for

C₁₈H₃₇HNCN is 9.50%.

*Example 5*

86.5 g. of mono-3-octadecyloxypropylamine were dissolved in a solvent mixture consisting of 500 cc. of carbon tetrachloride and 200 cc. of benzene. After cooling the solution to 10° C. there were added 16 g. of cyanogen chloride and 11 g. of 95% sodium hydroxide dissolved in 100 cc. of water according to the procedure of Example 1. The solution was thoroughly agitated during the addition of the cyanogen chloride and alkali. On standing, the reaction mixture separated into two layers, an upper water layer and a lower carbon tetrachloride-benzene layer. The lower layer was removed and evaporated at 14 mm. pressure on a steam bath, leaving the mono-3-octadecyloxypropyl cyanamide as a cream-colored wax-like material. Nitrogen analysis: found— 7.31%, calculated for C₁₈H₃₇OCH₂CH₂CH₂HNCN— 7.96%.

The method herein described is simple and economical, and provides a substantially pure product with high yields.

While the invention has been described with particular reference to specific embodiments, it is to be understood that it is not to be limited thereto but is to be construed broadly and restricted solely by the scope of the appended claims.

We claim:

1. The method of preparing a monosubstituted cyanamide of the formula

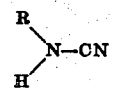

where R represents an aliphatic radical of at least 5 carbon atoms chosen from the group consisting of alkyl, alkyl containing one oxygen atom as a hetero-atom in the carbon chain and alkyl containing one sulphur atom as a hetero-atom in the carbon chain in which equimolecular quantities of the corresponding monoaliphatic amine and a cyanogen halide are reacted together which comprises treating one mol equivalent of the corresponding monoaliphatic amine with no more than one-half mol equivalent of a cyanogen halide to form the monosubstituted cyanamide and the monoaliphatic amine hydrohalide, thereafter adding to the reaction mixture a quantity of an alkali metal hydroxide sufficient to react with substantially all of the monoaliphatic amine hydrohalide present, thus freeing a quantity of the monoaliphatic amine, and repeating the steps, whereby a quantity of the monosubstituted cyanamide greater than 50% based on the amine used is produced.

2. The method of preparing a monosubstituted cyanamide of the formula

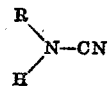

where R represents an aliphatic radical of at least 5 carbon atoms chosen from the group consisting of alkyl, alkyl containing one oxygen atom as a hetero-atom in the carbon chain and alkyl containing one sulphur atom as a hetero-atom in the carbon chain in which equimolecular quantities of the corresponding monoaliphatic amine and a cyanogen halide are reacted together which comprises treating one mol equivalent of the corresponding monoaliphatic amine with no more than one-half mol equivalent of a cyanogen halide to form the monosubstituted cyanamide and the monoaliphatic amine hydrohalide, thereafter adding to the reaction mixture a quantity of an alkali metal hydroxide sufficient to react with substantially all of the monoaliphatic amine hydrohalide present, thus freeing a quantity of the monoaliphatic amine, and repeating the steps until substantially one mol equivalent of the monoaliphatic amine has been reacted with one mol equivalent of the cyanogen halide.

3. The method of preparing a monosubstituted cyanamide of the formula

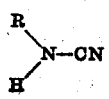

where R represents an aliphatic radical of at least 5 carbon atoms chosen from the group consisting of alkyl, alkyl containing one oxygen atom as a hetero-atom in the carbon chain and alkyl containing one sulphur atom as a hetero-atom in the carbon chain in which equimolecular quantities of the corresponding monoaliphatic amine and cyanogen chloride are reacted together which comprises treating one mol equivalent of the corresponding monoaliphatic amine with no more than one-half mol equivalent of cyanogen chloride to form the monosubstituted cyanamide and the monoaliphatic amine hydrochloride, thereafter adding to the reaction mixture a quantity of sodium hydroxide sufficient to react with substantially all of the monoaliphatic amine hydrochloride present, thus freeing a quantity of the monoaliphatic amine, and repeating the steps whereby a quantity of the monosubstituted cyanamide greater than 50% based on the amine used is produced.

4. The method of preparing a monosubstituted cyanamide of the formula

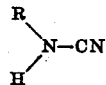

where R represents an aliphatic radical of at least 5 carbon atoms chosen from the group consisting of alkyl, alkyl containing one oxygen atom as a hetero-atom in the carbon chain and alkyl containing one sulphur atom as a hetero-atom in the carbon chain in which equimolecular quantities of the corresponding monoaliphatic amine and cyanogen chloride are reacted together which comprises treating one mol equivalent of the corresponding monoaliphatic amine with no more than one-half mol equivalent of cyanogen chloride to form the monosubstituted cyanamide and the monoaliphatic amine hydrochloride, thereafter adding to the reaction mixture a quantity of sodium hydroxide sufficient to react with substantially all of the monoaliphatic amine hydrochloride present, thus freeing a quantity of the monoaliphatic amine, and repeating the steps until substantially one mol equivalent of the monoaliphatic amine has been reacted with one mol equivalent of the cyanogen chloride.

5. The method of claim 1, further characterized in that the said reactions are carried out in a liquid solvent for the amine.

6. A monosubstituted cyanamide of the formula

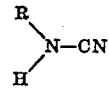

where R represents an aliphatic radical of at least 5 carbon atoms chosen from the group consisting of alkyl, alkyl containing one oxygen atom as a hetero-atom in the carbon chain, and alkyl containing one sulphur atom as a hetero-atom in the carbon chain.

7. Mono-n-amyl cyanamide.
8. Mono-octadecyl cyanamide.
9. Mono-3-octadecyloxypropyl cyanamide.

WALTER P. ERICKS.
PAUL P. McCLELLAN.